(12) United States Patent
Edirisooriya

(10) Patent No.: US 7,467,281 B2
(45) Date of Patent: Dec. 16, 2008

(54) MAPPING DATA BLOCKS TO STORAGE BLOCKS TO WRAP AROUND STORAGE DEVICES

(75) Inventor: Samanatha J. Edirisooriya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 10/866,406

(22) Filed: Jun. 10, 2004

(65) Prior Publication Data

US 2005/0283646 A1 Dec. 22, 2005

(51) Int. Cl.
*G06F 12/00* (2006.01)

(52) U.S. Cl. ..................... 711/202; 711/114

(58) Field of Classification Search ................. 711/114, 711/202
See application file for complete search history.

(56) References Cited

U.S. PATENT DOCUMENTS

| | | | |
|---|---|---|---|
| 5,146,588 A | 9/1992 | Crater et al. | |
| 5,271,012 A | 12/1993 | Blaum et al. | |
| 5,579,475 A | 11/1996 | Blaum et al. | |
| 6,012,123 A * | 1/2000 | Pecone et al. | 711/114 |
| 6,098,191 A | 8/2000 | Yamamoto et al. | |
| 6,101,615 A | 8/2000 | Lyons | |
| 6,138,125 A | 10/2000 | DeMoss | |
| 6,158,017 A | 12/2000 | Han et al. | |
| 6,247,157 B1 * | 6/2001 | Edirisooriya | 714/767 |
| 6,526,477 B1 | 2/2003 | Yuan et al. | |
| 6,665,773 B1 | 12/2003 | McCombs | |
| 6,742,137 B1 * | 5/2004 | Frey, Jr. | 714/6 |
| 6,871,317 B1 * | 3/2005 | Corbett | 714/800 |
| 7,047,358 B2 * | 5/2006 | Lee et al. | 711/114 |
| 7,080,278 B1 * | 7/2006 | Kleiman et al. | 714/6 |
| 7,188,270 B1 * | 3/2007 | Nanda et al. | 714/6 |
| 7,188,303 B2 | 3/2007 | Schmisseur | |
| 2002/0161855 A1 * | 10/2002 | Manczak et al. | 709/219 |
| 2003/0126523 A1 * | 7/2003 | Corbett et al. | 714/718 |
| 2005/0050384 A1 | 3/2005 | Horn | |
| 2005/0108292 A1 * | 5/2005 | Burton et al. | 707/200 |

OTHER PUBLICATIONS

Blaum, M., J. Brady, J. Bruck, and J. Menon, "Evenodd: An Efficient Scheme for Tolerating Double Disk Failures in RAID Architectures", IEEE Transactions on Computers, vol. 44, No. 2, Feb. 1995, pp. 192-202.

Burkhard, W.A. and J. Menon, "Disk Array Storage System Reliability", Proceedings of the Symposium of Fault-Tolerant Computing, 1993, pp. 432-441.

Chen, P.M., E.K. Lee, G.A. Gibson, R.H. Katz, and D.A. Patterson, "RAID: High-Performance, Reliable Secondary Storage", ACM Computing Surveys, Val. 26, No. 2, Jun. 1994, pp. 145-185.

(Continued)

*Primary Examiner*—Reba I Elmore
(74) *Attorney, Agent, or Firm*—Christopher K. Gagne

(57) ABSTRACT

Provided are a techniques for mapping data blocks to storage blocks. A portion of data is received, and the portion of data is segmented into one or more data blocks. The one or more data blocks are mapped to one or more storage blocks of one or more storage devices, wherein the one or more data blocks are mapped to wrap around the storage devices after each of the storage devices has been utilized.

15 Claims, 7 Drawing Sheets

OTHER PUBLICATIONS

Gibson, G.A., L. Hellerstein, R.M. Karp, R.H. Katz, and D.A. Patterson, "Coding Techniques for Handling Failures in Large Disk Arrays", Technical Report UCB/CSD No. 88/477, EECS Department, University of California, Berkeley, 1998, pp. 1-29.

Park, C., "Efficient Placement of Parity an Data to Tolerate Two Disk Failures in Disk Array Systems", IEEE Transactions on Parallel and Distributed Systems, vol. 6, No. 11, Nov. 1995, pp. 1177-1184.

Patterson, D.A., G. Gibson, and R.H. Katz, "A Case for Redundant Arrays of Inexpensive Disks (RAID)", Proceedings of the ACM International Conference on Management of Data, 1989, pp. 109-116.

U.S. Appl. No. 10/866,414, filed Jun. 10, 2004, entitled "Storage Device Parity Computation", invented by S.J. Edirisooriya.

PCT International Search Report and Written Opinion, Jun. 19, 2006, for International Application No. PCT/US2005/016554.

PCT International Preliminary Report on Patentability (IPRP), Dec. 28, 2006, for International Application No. PCT/US2005/016554.

* cited by examiner

MAPPING DATA BLOCKS TO STORAGE BLOCKS TO WRAP AROUND STORAGE DEVICES

BACKGROUND

Description of The Related Art

Conventional systems may include storage configurations with Redundant Array of Independent Disks (RAID) devices. There are several levels of RAID devices. For example, RAID devices Level 5 (RAID-5 devices) store parity information using a rotating parity array. Also, RAID devices Level 6 (RAID-6 devices) are similar to RAID-5 devices but include a second parity scheme that may be distributed across different drives.

Parity information is used to check whether data that has been moved from one storage area to another storage area (e.g., within a disk) or that has been transmitted between two components (e.g., two computers or two disks) has been lost or written over. In particular, an additional binary digit, the parity bit, is added to a group of bits that are moved together. Before the group of bits are sent, the bits in the group are counted, and, for odd parity, if the total number of bits is even, the parity bit is set to one, and the total number of bits transmitted adds up to an odd number (e.g., if the parity group is 101, the parity bit is set to one, and 1011 adds up to an odd number). If the total number of bits is odd, the parity bit is set to zero, and the total number of bits transmitted again forms an odd number (e.g., if the parity group is 100, the parity bit is set to zero, and 1000 adds up to an odd number). At the receiving end, each group of bits, along with the parity bit, is checked to see if the total number of bits adds up to an odd number, and, if so, transmission has occurred successfully. Alternatively, it is possible to use even parity, in which case the parity bit is set to one if there are an odd number of ones in the data.

Redundant disk arrays, such as RAID devices Level 5 (RAID-5 devices) and RAID-6 devices, may be used to build highly available and reliable disk subsystems, which is described further in A. Patterson, G. A. Gibson, and R. Katz, "A case for redundant arrays of inexpensive disks," in Proc. SIGMOD Int. Conf. Data Management, Chicago, Ill., 1988, pp. 109-116; Paul Massigilia, The RAID Book, 6$^{th}$ Edition, The RAID Advisory Board; S. Edirisooriya, "Method of Encoding Data Signals for Storage, U.S. Pat. No. 6,247,157, issued on Jun. 21, 2002. Typically, the exclusive-OR (XOR) of data from some number of disks is maintained on a redundant disk, and, in the event of a disk failure, the data on the failed disk may be reconstructed by performing the XOR operation on the data on the surviving disks, and writing this into a spare disk. The ⊕ symbol represents an XOR operation. With a two input XOR operation, for any two inputs, if either input is True (i.e., 1) (but not both), then the output is True (i.e., 1).

Disk striping may be described as taking a physical contiguous section of separate disks and breaking them down into smaller pieces and logically interleaving them. With disk striping, an I/O operation can have several sub-tasks issued in parallel to the smaller pieces on the effected disk members. Performance of disk arrays may be improved by spreading blocks of data across the disks as this enables multiple disks to work on a single I/O request in parallel, which improves the performance of a data storage system. RAID devices may be implemented with disk striping to improve performance during sequential data accesses. Additionally, disk striping may be used with RAID data protection to enhance I/O performance during sequential accesses.

FIG. 1 illustrates a RAID-5 disk array. In FIG. 1, there are five disks: Disk 0, Disk 1, Disk 2, Disk 3, and Disk 4. Each of the five disks has five storage blocks that may store data blocks. There are five disk stripes: Stripe 0, Stripe 1, Stripe 2, Stripe 3, and Stripe 4. A data block is represented with a D (for data block) and a unique number (e.g., D0, D1, etc.). Parity information 108, 110, 112, 114, and 116 is represented with a P (for horizontal parity) and a unique number (i.e., P0, P1, P2, P3, and P4).

Data block mapping may be described as a technique of determining which disk is to store a particular data block (e.g., Disk 0 stores data block D0). With the data block mapping illustrated in FIG. 1, for a sequential access request spanning four consecutive data blocks (e.g., D0, D1, D2, and D3), four disks (e.g., Disk 0, Disk 1, Disk 2, and Disk 3) participate in servicing the request. If the sequential access request spans five consecutive data blocks (e.g., D0, D1, D2, D3, and D4), again four disks (e.g., Disk , Disk 1, Disk 2, and Disk 3) participate in servicing the request.

FIG. 2 illustrates a RAID-6 disk array. In FIG. 2, there are six disks, Disk 0, Disk 1, Disk 2, Disk 3, Disk 4, and Disk 5, and there are four disk stripes: Stripe 0 , Stripe 1, Stripe 2, and Stripe 3. Each of the six disks has four storage blocks that may store data blocks. A horizontal parity block is preceded with "HP" (for horizontal parity) and stored as HP0 210, HP1 212, HP2 214, and HP3 216. A diagonal parity block is preceded with "DP" (for diagonal parity) and stored as DP0 220, DP1 222, DP2 224, and DP3 226. The horizontal and diagonal parity blocks are spread over different disks in accordance with, for example, a technique described in U.S. Pat. No. 6,247,157, issued on Jun. 21, 2001. In this example, parity information is stored in blocks HP0 210, HP 1 212, HP2 214, and HP3 216 and in blocks DP0 220, DP1 222, DP2 224, and DP3 226 so that data may be reconstructed even if two disks fail.

With the data block mapping illustrated in FIG. 2, for a sequential access request spanning four consecutive data blocks (e.g., D0, D1, D2, and D3), four disks (e.g., Disk 0, Disk 1, Disk 2, and Disk 3) participate in servicing the request. If the sequential access request spans five consecutive data blocks (e.g., D0, D1, D2, D3, and D4), again four disks (e.g., Disk 0 Disk 1 Disk , and Disk 3) participate in servicing the request.

Thus, with conventional data mapping techniques, certain sequential access requests utilize fewer than all available disks.

Notwithstanding existing techniques for data block mapping, there is a need in the art for improved data block mapping for storage devices.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 3:
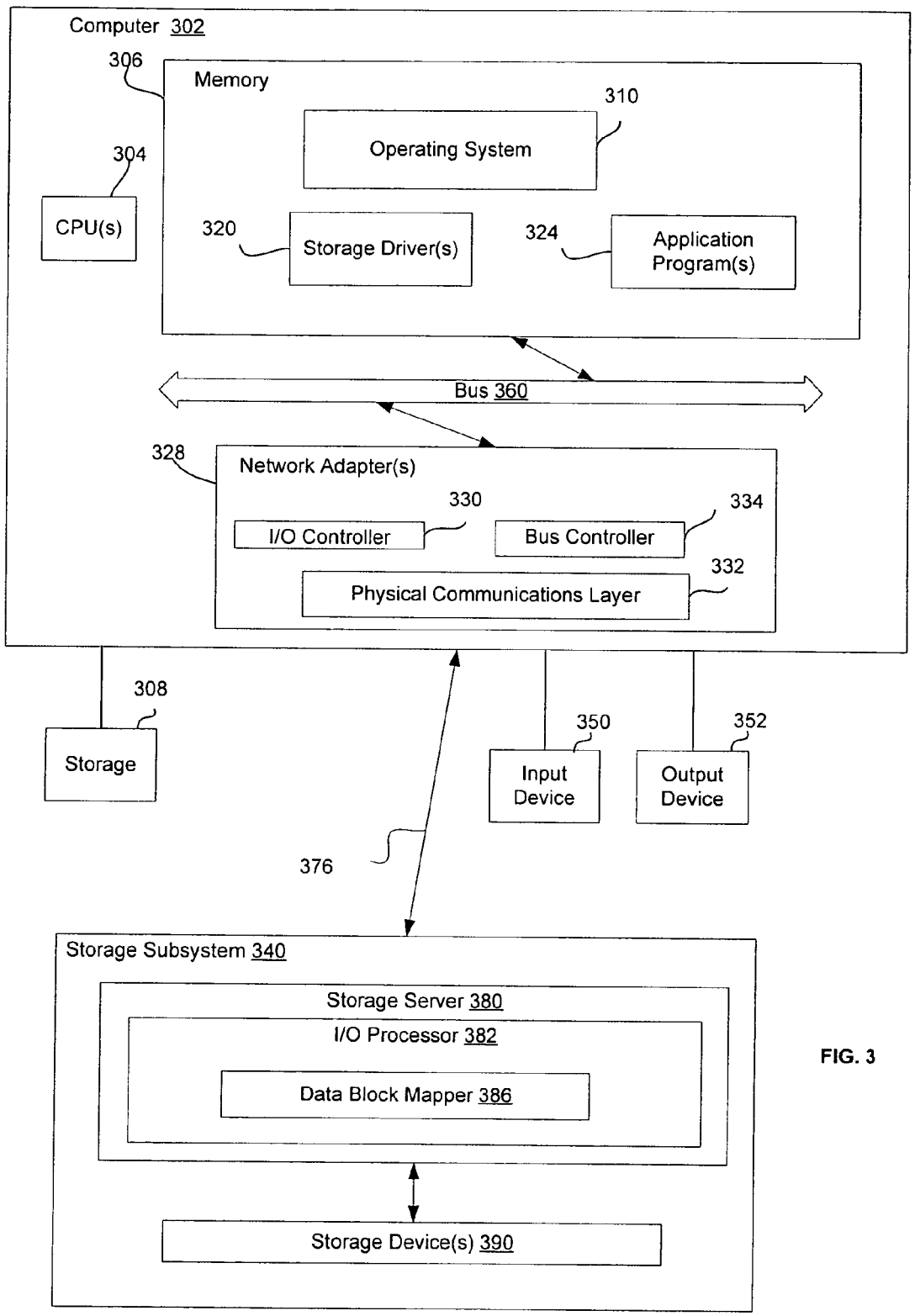
FIG. 3 illustrates details of a computing environment in accordance with certain embodiments.

FIG. 3 illustrates details of a computing environment in accordance with certain embodiments. A host computer 302 includes one or more central processing units (CPUs) 304, a volatile memory 306, non-volatile storage 308 (e.g., magnetic disk drives, optical disk drives, a tape drive, etc.), an operating system 310, and one or more network adapters 328. One or more storage drivers 320 and one or more application programs 324 reside in memory 306 for execution by CPUs 304 and are capable of transmitting and retrieving packets from remote storage subsystem 340 over a connection 376. The host computer 302 may comprise any computing device known in the art, such as a mainframe, server, personal computer, workstation, laptop, handheld computer, telephony device, network appliance, virtualization device, storage controller, etc. Any CPU 304 and operating system 310 known in the art may be used. Programs and data in memory 306 may be swapped into storage 308 as part of memory management operations. The connection 376 may comprise, for example, any type of network or any type of bus interface known in the art. The network may be, for example, a Storage Area Network (SAN), a Local Area Network (LAN), Wide Area Network (WAN), the Internet, an Intranet, etc. The bus interface may be, for example, any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002)), a Small Computer System Interface (SCSI) (American National Standards Institute (ANSI) SCSI Controller Commands-2 (SCC-2) NCITS.318: 1998), Serial ATA ((SATA 1.0a Specification, published Feb. 4, 2003), etc.

The storage subsystem 340 includes a storage server 380 (i.e., a type of computing device) connected to one or more storage devices 390. The storage devices 390 may each comprise a storage device or an array of storage devices, such as Direct Access Storage Devices (DASDs), Just a Bunch of Disks (JBOD), Redundant Array of Independent Disks (RAID), virtualization devices, etc. The storage server 380 includes an I/O processor 382, which includes a data block mapper 386. The data block mapper 386 is capable of mapping data blocks to storage blocks in storage devices 390 in accordance with certain embodiments. In alternative embodiments, the data block mapper 386 may be located at host computer 302 or at another computing device connected to storage subsystem 340.

Each network adapter 328 includes various components implemented in the hardware of the network adapter 328. Each network adapter 328 is capable of transmitting and receiving packets of data over connection 376.

Each storage driver 320 includes network adapter 328 specific commands to communicate with each network adapter 328 and interface between the operating system 310 and each network adapter 328. Each network adapter 328 or storage driver 320 implements logic to process the packets, such as a transport protocol layer to process the content of messages included in the packets that are wrapped in a transport layer, such as Transmission Control Protocol (TCP) (IETF RFC 793, published September 3981) and/or Internet Protocol (IP) (IETF RFC 791, published September 3981), the Internet Small Computer System Interface (iSCSI) (IETF RFC 3347, published February 2003), Fibre Channel (American National Standards Institute (ANSI) X3.269-199X, Revision 012, Dec. 4, 3995), or any other transport layer protocol known in the art. The transport protocol layer unpacks a payload from the received Transmission Control Protocol/Internet Protocol (TCP/IP) packet and transfers the data to a storage driver 320 to return to an application program 324. Further, an application program 324 transmitting data transmits the data to a storage driver 320, which then sends the data to the transport protocol layer to package in a TCP/IP packet before transmitting over the connection 376.

A bus controller 334 enables each network adapter 328 to communicate on a computer bus 360, which may comprise any bus interface known in the art, such as a Peripheral Component Interconnect (PCI) bus (PCI Special Interest Group, PCI Local Bus Specification, Rev 2.3, published March 2002), Small Computer System Interface (SCSI) (American National Standards Institute (ANSI) SCSI Controller Commands-2 (SCC-2) NCITS.318:1998), Serial ATA ((SATA 3.0a Specification, published Feb. 4, 2003), etc. The network adapter 328 includes a network protocol for implementing a physical communication layer 332 to send and receive network packets to and from remote data storages over a connection 376. In certain embodiments, the network adapter 328 may implement the Ethernet protocol (IEEE std. 802.3, published Mar. 8, 2002), Fibre Channel protocol (American National Standards Institute (ANSI) X3.269-199X, Revision 012, Dec. 4, 3995) or any other network communication protocol known in the art.

The network adapter 328 includes an Input/Output (I/O) controller 330. In certain embodiments, the I/O controller 330 may comprise Internet Small Computer System Interface (iSCSI controllers), and it is understood that other types of network controllers, such as an Ethernet Media Access Controller (MAC) or Network Interface Controller (NIC), or cards may be used.

The storage 308 may comprise an internal storage device or an attached or network accessible storage. Programs in the storage 308 may be loaded into the memory 306 and executed by the CPU 304. An input device 350 is used to provide user input to the CPU 304, and may include a keyboard, mouse, pen-stylus, microphone, touch sensitive display screen, or any other activation or input mechanism known in the art. An output device 352 is capable of rendering information transferred from the CPU 304, or other component, such as a display monitor, printer, storage, etc.

Various structures and/or buffers (not shown) may reside in memory 306 or may be located in a storage unit separate from the memory 306 in certain embodiments.

Figure 4:
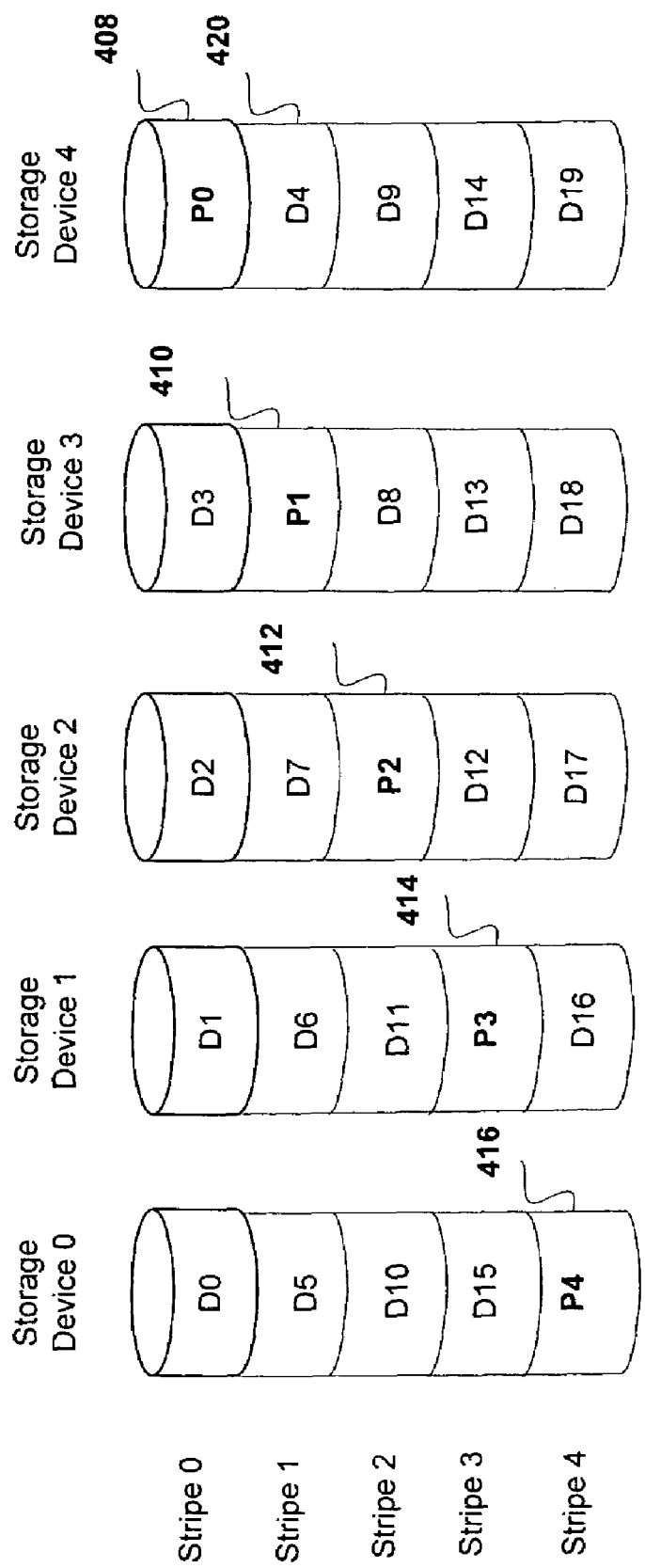
FIG. 4 illustrates a storage device array with data block mapping in accordance with certain embodiments.

FIG. 4 illustrates a storage device array with data block mapping in accordance with certain embodiments. In certain embodiments, the illustrated storage device array may be a RAID-5 disk array. In FIG. 4, there are five storage devices: Storage Device 0, Storage Device 1, Storage Device 2, Storage Device 3, and Storage Device 4, and there are five storage device stripes: Stripe 0, Stripe 1, Stripe 2, Stripe 3, and Stripe 4. Each of the five storage devices has five storage blocks that may store data blocks. Parity information 408, 410, 412, 414, and 416 is represented with a P (for horizontal parity) and a unique number (i.e., P0, P1, P2, P3, and P4).

Figure 1:
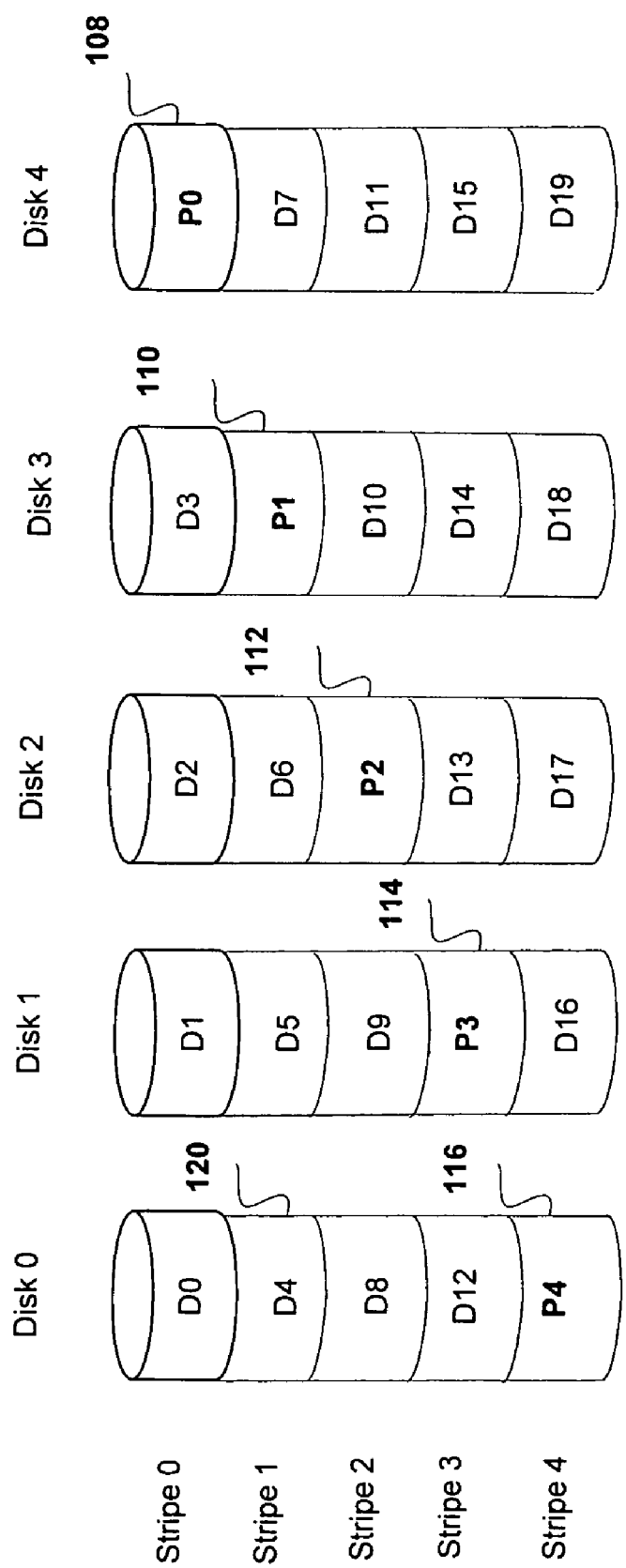
FIG. 1 illustrates a RAID-5 disk array.

Data block mapping in FIG. 4 is different from that in FIG. 1. For example, in FIG. 4, data block D4 420 resides on Storage Device 4, whereas in FIG. 1, data block D4 120 resides on Storage Device 0. Thus, with the data block mapping illustrated in FIG. 4, for a sequential access request spanning five consecutive data blocks (e.g., D0, D1, D2, D3, and D4), five storage devices (e.g., Storage Device 0, Storage Device 1, Storage Device 2, Storage Device 3, and Storage Device 4) participate in servicing the request.

Therefore, with embodiments, data blocks are allocated across available storage devices (e.g., disks) so that a sequential access request for a number of data blocks that is equivalent to the available number of storage devices is serviced using all of the storage devices.

Figure 5:
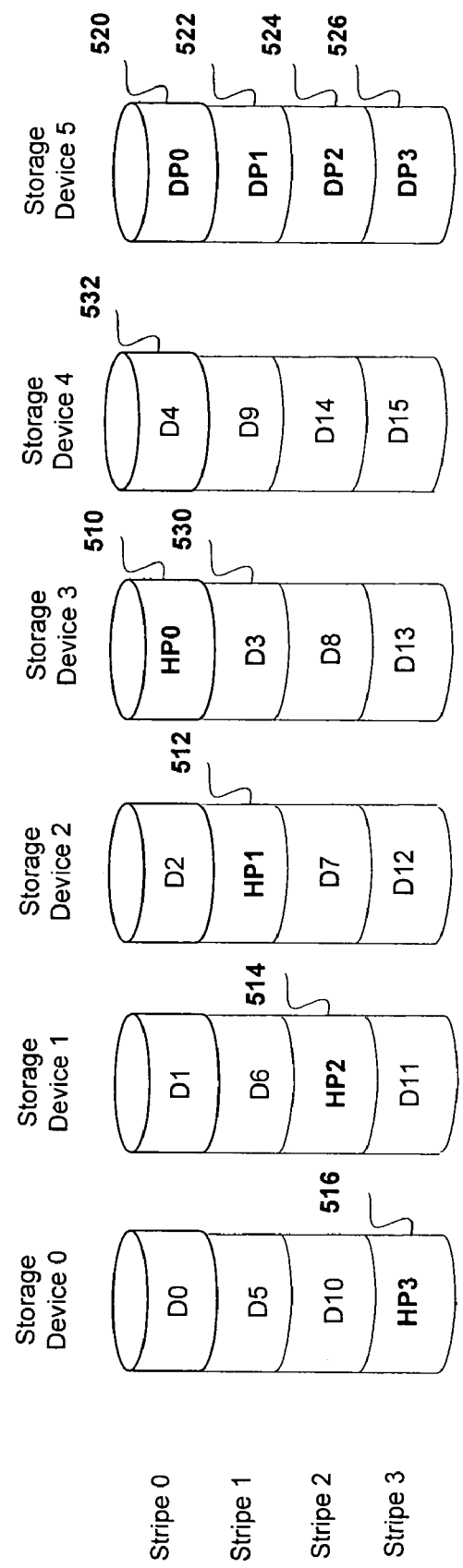
FIG. 5 illustrates a storage device array with data block mapping in accordance with certain embodiments.

FIG. 5 illustrates a storage device array with data block mapping in accordance with certain embodiments. In certain embodiments, the illustrated storage device array may be a RAID-6 disk array. In FIG. 5, there are six storage devices, Storage Device 0, Storage Device 1, Storage Device 2, Storage Device 3, Storage Device 4, and Storage Device 5, and there are four storage device stripes: Stripe 0, Stripe 1, Stripe 2, and Stripe 3. Each of the six storage devices has four storage blocks that may store data blocks. In this example, Storage Device 5 is a redundant storage device that stores information so that in case of failure of Storage Device 0, Storage Device 1, Storage Device 2, Storage Device 3 or Storage Device 4, the failed storage device can be reconstructed with information stored on Storage Device 5. A horizontal parity block is preceded with "HP" (for horizontal parity) and stored as HP0 510, HP1 512, HP2 514, and HP3 516. A diagonal parity block is preceded with "DP" (for diagonal parity) and stored as DP0 520, DP1 522, DP2 524, and DP3 526.

Figure 2:
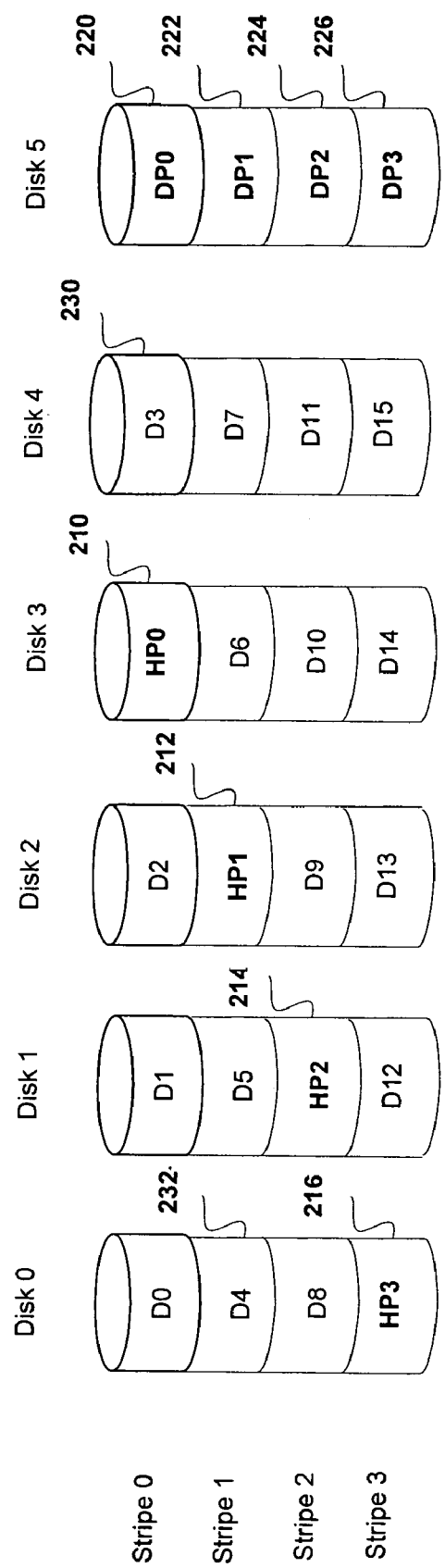
FIG. 2 illustrates a RAID-6 disk array.

Data block mapping in FIG. 5 is different from that in FIG. 2. For example, in FIG. 5, data block D3 530 resides on Storage Device 3 and data block D4 532 resides on Storage Device 4, whereas in FIG. 2, data block D3 230 resides on Storage Device 4 and data block D4 232 resides on Storage Device 0. Thus, with the data block mapping illustrated in FIG. 5, for a sequential access request spanning five consecutive data blocks (e.g., D0, D1, D2, D3, and D4), five storage devices (e.g., Storage Device 0, Storage Device 1, Storage Device 2, Storage Device 3, and Storage Device 4) participate in servicing the request.

Figure 6:
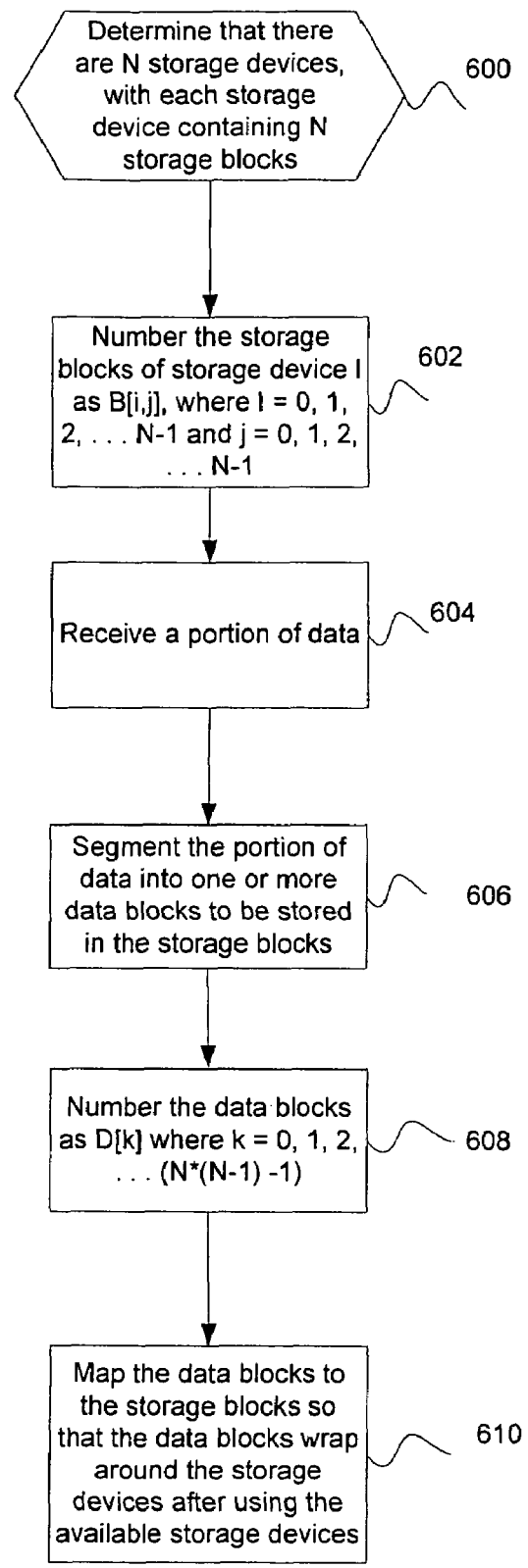
FIG. 6 illustrates operations for data block mapping in accordance with certain embodiments.

FIG. 6 illustrates operations for data block mapping in accordance with certain embodiments. In FIG. 6, control begins at block 600 with the data block mapper 386 determining that there are N storage devices, with each storage device containing N blocks, where N is any positive integer value. In block 602, the data block mapper 386 numbers the blocks of each storage device i, where B represents a block, using the following formula: B[i,j], where i=0, 1, 2, ... N−1 and represents a storage device and j=0, 1, 2, ... N−1 and represents a stripe. For example, in FIG. 3, data block D0 is stored in storage block [0,0] and data block D7 is stored in storage block [2,1].

In block 604, the data block mapper 386 receives a portion of data. In block 606, the data block mapper 386 segments the portion of data into one or more data blocks to be stored in the storage blocks. In block 608, the data block mapper 386 numbers the data blocks as D[k] where k=0, 1, 2, ... (N*(N−1)−1). In block 610, the data block mapper 386 maps the data blocks to the storage blocks so that the data blocks wrap around the storage devices after using the available storage devices.

Figure 7:
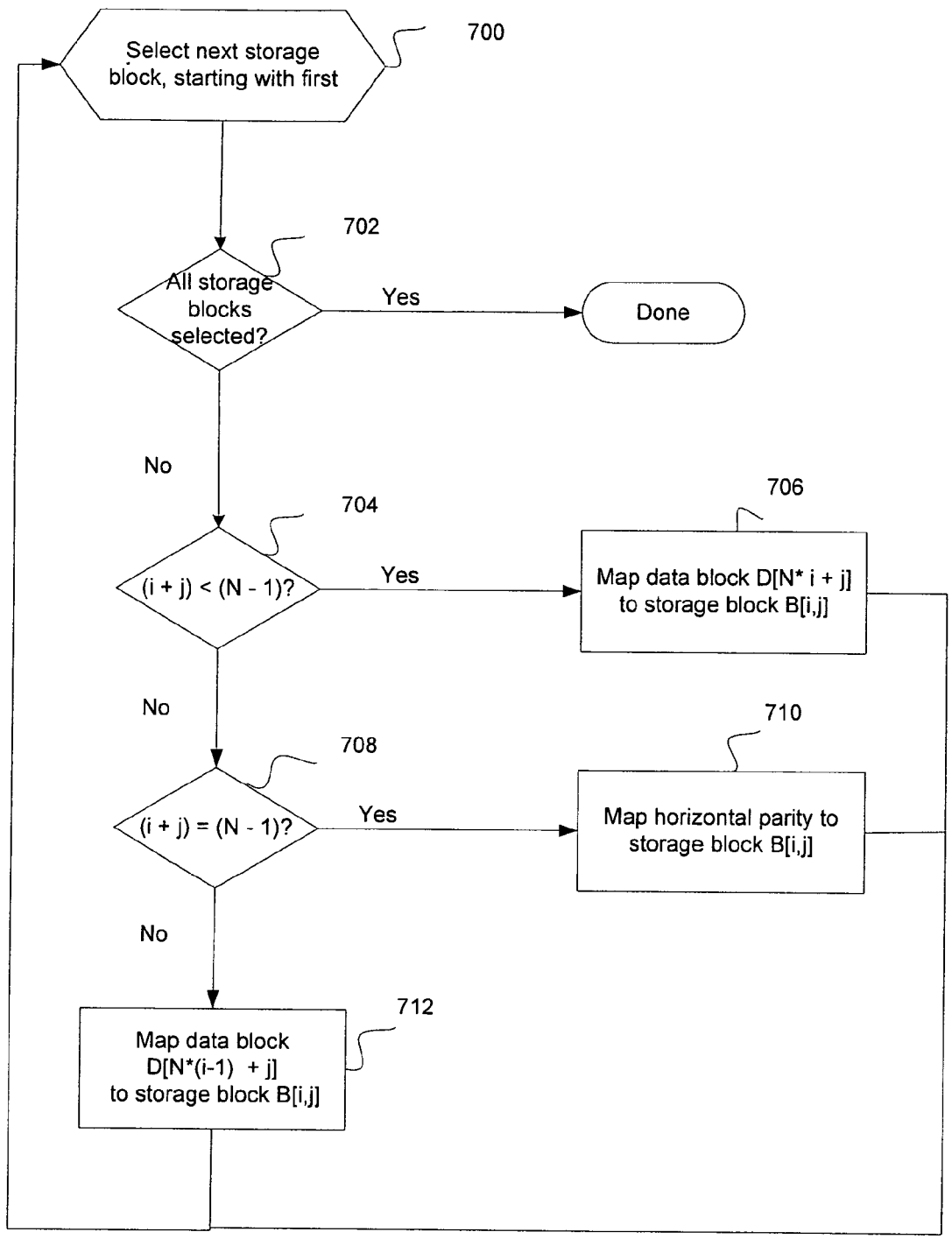
FIG. 7 illustrates further details of operations for data block mapping in accordance with certain embodiments.

FIG. 7 illustrates further details of operations for data block mapping in accordance with certain embodiments. In block 700, the data block mapper 386 selects a next storage block starting with the first storage block. In certain embodiments, the storage blocks may be selected in any order. In block 702, the data block mapper 386 determines whether all storage blocks have been selected. If so, processing is done, otherwise, processing continues to block 704.

In block 704, the data block mapper 386 determines whether (i+j)<(N−1) for the selected storage block B[i,j]. If so, processing continues to block 706, otherwise, processing continues to block 708. In block 706, the data block mapper 386 maps data block D[N*i+j] to storage block B[i,j]. From block 706, processing loops back to block 700.

In block 708, the data block mapper 386 determines whether (i+j) =(N −1) for the selected storage block B[i,j]. If so, processing continues to block 710, otherwise, processing continues to block 712. In block 710, the data block mapper 386 maps a horizontal parity to storage block B[i,j]. From block 710, processing loops back to block 700.

If the data block mapper 386 determines that (i +j) >(N −1) for the selected storage block B[i,j], then, in block 712, the data block mapper 386 maps data block D[N*(i−1) +j] to storage block B[i,j]. Then, processing loops from block 712 to block 700.

Thus, with certain embodiments, data blocks are allocated to storage blocks of different storage devices such that wrap around to storage devices occurs after all storage devices have been utilized.

Also, certain embodiments provide a mechanism for mapping data blocks to storage blocks to improve striping properties of storage devices, such as RAID-5 and RAID-6 devices.

Additional Embodiment Details

The described embodiments may be implemented as a method, apparatus or article of manufacture using programming and/or engineering techniques to produce software, firmware, hardware, or any combination thereof. The terms "article of manufacture" and "circuitry" as used herein refer to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

The illustrated operations of FIGS. 6 and 7 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method for mapping data blocks to storage blocks, comprising:
   receiving a portion of data;
   segmenting the portion of data into one or more data blocks;
   mapping the one or more data blocks to one or more storage blocks of one or more storage devices, wherein the one or more data blocks are mapped to wrap around the storage devices after each of the storage devices has been utilized by, for each of the one or more storage blocks,
      comparing $(i+j)$ to $(N-1)$ for a storage block $B[i,j]$, wherein i is a number representing a particular storage device and j is a number representing a stripe, wherein a stripe includes one or more storage blocks from each of the one or more storage devices, and wherein N represents a total number of storage devices;
      in response to determining that $(i+j)<(N-1)$ for the storage block $B[i,j]$, storing a data block $D[N*i+j]$ to the storage block $B[i,j]$; and
      in response to determining that $(i+j)>(N-1)$ for the storage block $B[i,j]$, storing a data block $D[N*i-j]$ to the storage block $B[i,j]$; and
   in response to receiving a sequential access request spanning N consecutive data blocks, using N storage devices to service the request.

2. The method of claim 1, further comprising:
   determining that there are N storage devices, with each storage device containing N storage blocks.

3. The method of claim 2, further comprising:
   numbering the one or more storage blocks of each storage device as $B[i,j]$, where $i=0, 1, 2, \ldots N-1$ and where $j=0, 1, 2, \ldots N-1$.

4. The method of claim 3, further comprising:
   numbering the one or more data blocks as $D[k]$ where $k=0, 1, 2, \ldots (N*(N-1)-1)$.

5. The method of claim 4, further comprising:
   in response to determining that $(i+j)=(N-1)$ for a storage block $B[i,j]$, mapping a parity block to the storage block $B[i,j]$.

6. An article of manufacture for mapping data blocks to storage blocks, wherein the article of manufacture comprises a computer readable storage medium storing instructions executed by a processor, and wherein the article of manufacture is operable to:
   receive a portion of data;
   segment the portion of data into one or more data blocks;
   map the one or more data blocks to one or more storage blocks of one or more storage devices, wherein the one or more data blocks are mapped to wrap around the storage devices after each of the storage devices has been utilized, by, for each of the one or more storage blocks,
      comparing $(i+j)$ to $(N-1)$ for a storage block $B[i,j]$, wherein i is a number representing a particular storage device and j is a number representing a stripe, wherein a stripe includes one or more storage blocks from each of the one or more storage devices, and wherein N represents a total number of storage devices;
      in response to determining that $(i+j)<(N-1)$ for the storage block $B[i,j]$, storing a data block $D[N*i+j]$ to the storage block $B[i,j]$; and
      in response to determining that $(i+j)>(N-1)$ for the storage block $B[i,j]$, storing a data block $D[N*(i+1)+j]$ to the storage block $B[i,j]$; and
   in response to receiving a sequential access request spanning N consecutive data blocks, use N storage devices to service the request.

7. The article of manufacture of claim 6, wherein the article of manufacture is operable to:
   determine that there are N storage devices, with each storage device containing N storage blocks.

8. The article of manufacture of claim 7, wherein the article of manufacture is operable to:
   number the one or more storage blocks of each storage device as $B[i,j]$, where $i=0, 1, 2, \ldots N-1$ and where $j=0, 1, 2, \ldots N-1$.

9. The article of manufacture of claim 8, wherein the article of manufacture is operable to:
   number the one or more data blocks as $D[k]$ where $k=0, 1, 2, \ldots (N*(N-1)-1)$.

10. The article of manufacture of claim 9, wherein the article of manufacture is operable to:
    in response to determining that $(i+j)=(N-1)$ for a storage block $B[i,j]$, map a parity block to the storage block $B[i,j]$.

11. A system for mapping data blocks to storage blocks, comprising:
    circuitry at an Input/Output processor operable to:
      receive a portion of data;
      segment the portion of data into one or more data blocks;
      map the one or more data blocks to one or more storage blocks of one or more storage devices, wherein the one or more data blocks are mapped to wrap around the storage devices after each of the storage devices has been utilized, by, for each of the one or more storage blocks,
         comparing $(i+j)$ to $(N-1)$ for a storage block $B[i,j]$, wherein i is a number representing a particular storage device and j is a number representing a stripe, wherein a stripe includes one or more storage blocks from each of the one or more storage devices, and wherein N represents a total number of storage devices;
         in response to determining that $(i+j)<(N-1)$ for the storage block $B[i,j]$, storing a data block $D[N*(i+j)]$ to the storage block $B[i,j]$; and
         in response to determining that $(i+j)>(N-1)$ for the storage block $B[i,j]$, storing a data block $D[N*(i-1)+j]$ to the storage block $B[i,j]$; and
      in response to receiving a sequential access request spanning N consecutive data blocks, use N storage devices to service the request.

12. The system of claim 11, wherein the circuitry is operable to:
    determine that there are N storage devices, with each storage device containing N storage blocks.

13. The system of claim 12, wherein the circuitry is operable to:

number the one or more storage blocks of each storage device as B[i,j], where i=0, 1, 2, ... N−1 and where j=0, 1, 2, ... N−1.

14. The system of claim 13, wherein the circuitry is operable to:
number the one or more data blocks as D[k] where k=0, 1, 2, ... (N*(N−1)−1).

15. The system of claim 14, wherein the circuitry is operable to:
in response to determining that (i+j)=(N−1) for a storage block B[i,j], map a parity block to the storage block B[i,j].

* * * * *

UNITED STATES PATENT AND TRADEMARK OFFICE
CERTIFICATE OF CORRECTION

PATENT NO.         : 7,467,281 B2                                          Page 1 of 1
APPLICATION NO. : 10/866406
DATED              : December 16, 2008
INVENTOR(S)        : Edirisooriya It is certified that error appears in the above-identified patent and that said Letters Patent is hereby corrected as shown below:

In column 7, line 35, in Claim 1, delete "D[N*i-j]" and insert -- D[N*(i-1)+j] --, therefor.

In column 7, line 50, in Claim 4, delete "(N*( N-1)-1)." and insert -- (N*(N-1)-1). --, therefor.

In column 8, line 11, in Claim 6, delete "D[N*(i+1)+j]" and insert -- D[N*(i-1)+j] --, therefor.

In column 8, line 29, in Claim 9, delete "(N*( N-1)-1)." and insert -- (N*(N-1)-1). --, therefor.

In column 8, line 53, in Claim 11, delete "D[N*(i+j]" and insert -- D[N*i+j] --, therefor.

Signed and Sealed this

Third Day of March, 2009

JOHN DOLL
*Acting Director of the United States Patent and Trademark Office*